(12) United States Patent
Grehn et al.

(10) Patent No.: US 10,488,595 B2
(45) Date of Patent: Nov. 26, 2019

(54) PHOTONIC COMPONENT AND METHOD FOR PRODUCING SAME

(71) Applicant: Sicoya GmbH, Berlin (DE)

(72) Inventors: Moritz Grehn, Berlin (DE); Sven Otte, Hohen Neuendorf (DE); Christoph Theiss, Berlin (DE); Stefan Meister, Berlin (DE); David Selicke, Berlin (DE); Hanjo Rhee, Berlin (DE)

(73) Assignee: Sicoya GmbH, Berlin (DE)

( * ) Notice: Subject to any disclaimer, the term of this patent is extended or adjusted under 35 U.S.C. 154(b) by 0 days.

(21) Appl. No.: 16/324,118

(22) PCT Filed: Jul. 28, 2017

(86) PCT No.: PCT/DE2017/200075
§ 371 (c)(1),
(2) Date: Feb. 7, 2019

(87) PCT Pub. No.: WO2018/028751
PCT Pub. Date: Feb. 15, 2018

(65) Prior Publication Data
US 2019/0179082 A1 Jun. 13, 2019

(30) Foreign Application Priority Data
Aug. 12, 2016 (DE) .................. 10 2016 215 076

(51) Int. Cl.
G02B 6/30 (2006.01)
G02B 6/34 (2006.01)
(Continued)

(52) U.S. Cl.
CPC .............. G02B 6/30 (2013.01); G02B 6/34 (2013.01); G02B 6/3636 (2013.01); G02B 6/4214 (2013.01); G02B 2006/12107 (2013.01)

(58) Field of Classification Search
CPC ........ H01L 2924/00014; G02B 6/4214; G02B 6/30; G02B 6/10
See application file for complete search history.

(56) References Cited

U.S. PATENT DOCUMENTS 3,896,305 A   7/1975   Ostrowsky et al.
4,897,711 A   1/1990   Blonder et al.
(Continued)

FOREIGN PATENT DOCUMENTS

DE   2 419 030      11/1974
DE   39 14835 C1    7/1990
(Continued)

OTHER PUBLICATIONS

C. Strandman, et al.; "Fabrication of 45° Mirrors Together With Well-Defined V-Grooves Using Wet Anisotropic Etching of Silicon" (1995): Journal of Microelectromechanical Systems, vol. 4, No. 4, Dec. 1995, pp. 213-219., 1995 IEEE.
(Continued)

Primary Examiner — Jennifer Doan
(74) Attorney, Agent, or Firm — Gordon Rees Scully Mansukhani, LLP

(57) ABSTRACT

A photonic component that includes a photonically integrated chip and a fiber holder that is mechanically connected to said chip. The fiber holder includes at least one groove with an optical fiber laid therein. The chip includes a substrate whose substrate base material is a semiconductor material, an integrated optical waveguide that is integrated into one or more material layers of the chip, which layers are wave guiding and positioned on the substrate, a coupler formed in the optical waveguide or connected to said optical waveguide, particularly a grating coupler, and an optical diffraction and refraction structure that is integrated into one or more material layers of the chip which are positioned above the optical coupler when viewed from the substrate, (Continued)

and that shapes the beam prior to its being coupled into the waveguide or after being coupled out of the waveguide.

19 Claims, 13 Drawing Sheets

(51) Int. Cl.
    *G02B 6/42*     (2006.01)
    *G02B 6/36*     (2006.01)
    *G02B 6/12*     (2006.01)

(56) References Cited

U.S. PATENT DOCUMENTS

| | | |
|---|---|---|
| 5,071,213 A | 12/1991 | Chan |
| 5,282,080 A | 1/1994 | Scifres et al. |
| 6,115,521 A | 9/2000 | Tran et al. |
| 6,267,525 B1 | 7/2001 | Okuda et al. |
| 7,187,491 B1 * | 3/2007 | Bratkovski ............ B82Y 20/00 359/298 |
| 7,944,958 B2 * | 5/2011 | Konttinen ............. G02F 1/3501 372/21 |
| 2002/0037137 A1 | 3/2002 | Wu et al. |
| 2003/0108468 A1 | 6/2003 | Schlafer et al. |
| 2003/0118288 A1 | 6/2003 | Korenaga et al. |
| 2013/0209026 A1 | 8/2013 | Doany et al. |
| 2014/0029894 A1 | 1/2014 | Bowen |
| 2015/0260931 A1 | 9/2015 | Miao et al. |
| 2016/0018601 A1 | 1/2016 | Gardes et al. |

FOREIGN PATENT DOCUMENTS

| | | |
|---|---|---|
| DE | 41 06 721 A1 | 9/1992 |
| DE | 43 23 681 A1 | 1/1995 |
| DE | 689 18 729 TS | 2/1995 |
| DE | 44 16 563 C1 | 7/1995 |
| DE | 44 45 997 A1 | 6/1996 |
| DE | 195 10 559 C1 | 7/1996 |
| DE | 689 29 065 T2 | 9/2000 |
| DE | 101 60 508 A1 | 6/2003 |
| DE | 10 2009 023 071 A1 | 12/2009 |
| DE | 10 2014 219 663 A1 | 3/2016 |
| EP | 0 331 331 B1 | 2/1989 |
| EP | 0 611 975 B1 | 2/1989 |
| EP | 0 603 479 A1 | 10/1993 |
| EP | 0 634 676 A1 | 7/1994 |
| EP | 0 987 801 B1 | 9/1999 |
| WO | WO 2011/066122 A2 | 6/2011 |
| WO | WO 2013/148208 A1 | 10/2013 |
| WO | WO 2016/011002 A1 | 1/2016 |

OTHER PUBLICATIONS

Hsiao-Chin Lan et.al.,"Monolithic Integration of Elliptic Symmetry Diffractive Optical Element on Silicon-Based 45° Micro-Reflector", Optics Express, vol. 17, No. 23, Nov. 2, 2009, pp. 20938-20944.
German Examination Report dated Apr. 5, 2017 in related German Patent Application No. 10 2016 215 076.6; filed Aug. 12, 2016.
International Search Report dated Jan. 22, 2018 in related International Patent Application No. PCT/DE2017/200075; filed Jul. 28, 2017.

* cited by examiner

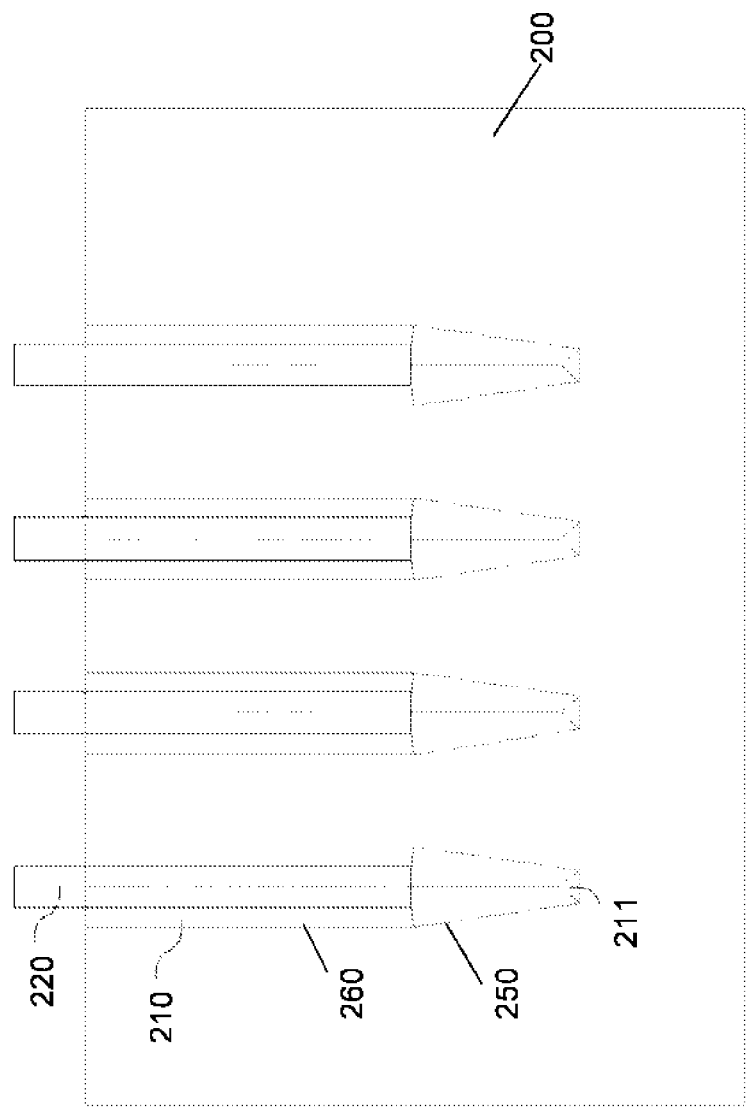
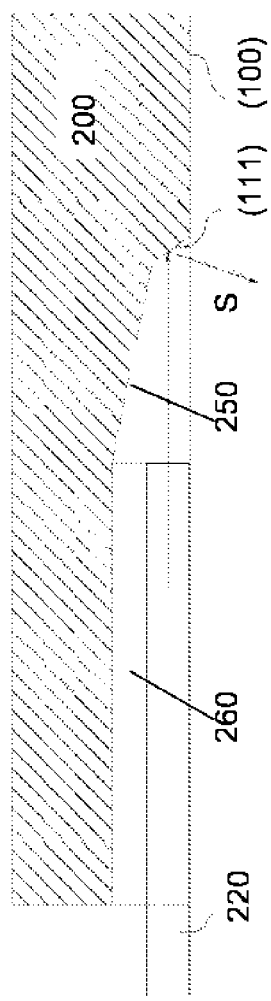
Fig. 7
Fig. 8

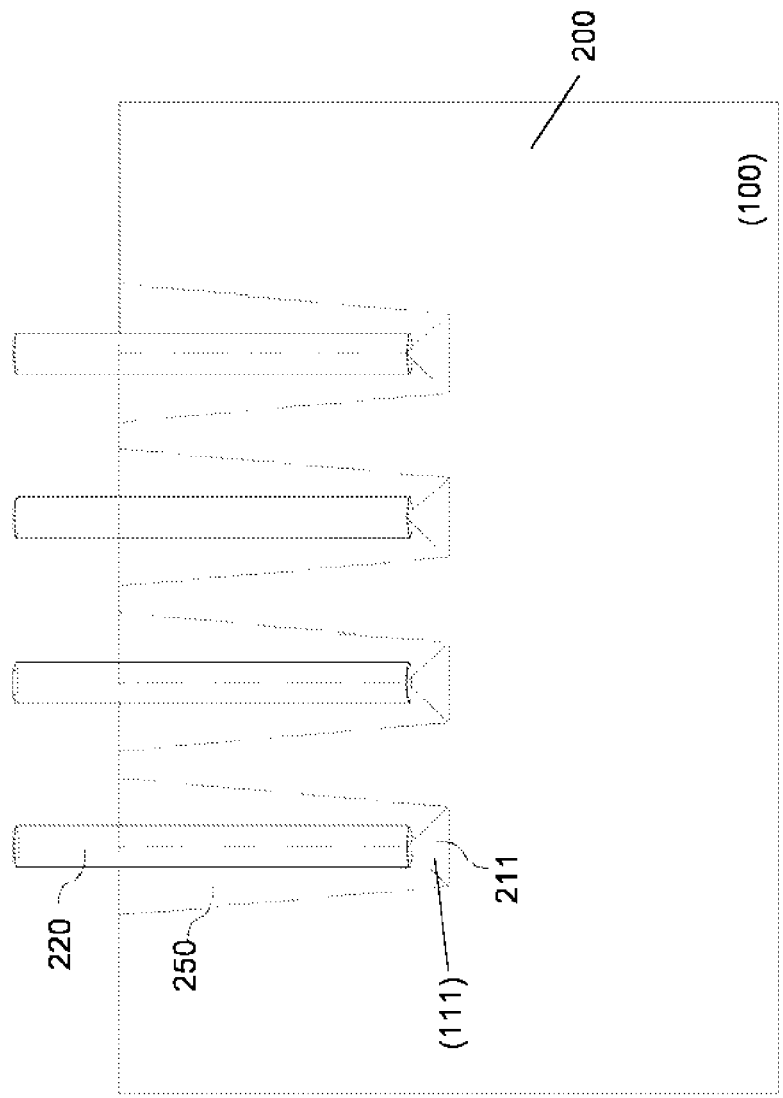
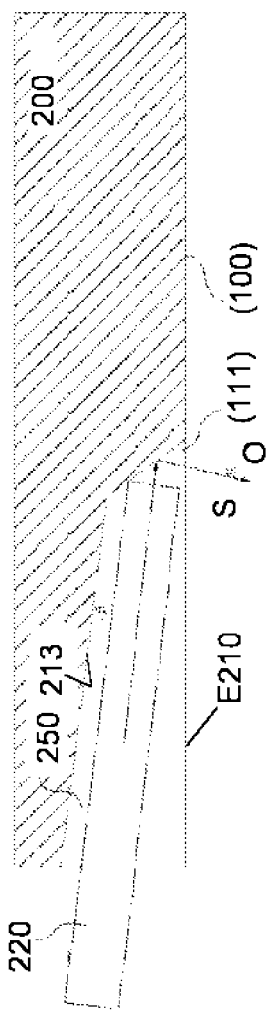
Fig.9
Fig.10

PHOTONIC COMPONENT AND METHOD FOR PRODUCING SAME

BACKGROUND

The invention relates to a photonic structural element having a photonically integrated chip and a fiber holder that is mechanically connected to the chip, wherein the fiber holder has at least one groove into which an optical fiber is placed and has at least one mirror surface reflecting radiation of the fiber in the direction of the chip and/or radiation of the chip in the direction of the fiber. A structural element of this type is known from the German patent specification DE 44 45 997.

The invention is based on the object of specifying a photonic structural element that is able to be manufactured cost-effectively and has as compact a structure as possible.

SUMMARY

According to the invention, this object is achieved by a photonic structural element having the features of claim 1. Advantageous refinements of the structural element according to the invention are specified in the dependent claims.

Accordingly, provision is made in accordance with the invention for the chip to have: a substrate, the substrate base material of which is a semiconductor material, an integrated optical waveguide that is integrated in one or more waveguiding material layers of the chip which are situated on the substrate, a coupler, in particular a grating coupler, that is formed in the optical waveguide or connected to the optical waveguide, and an optical diffraction and refraction structure that is integrated in one or more material layers of the chip which are situated—as viewed from the substrate—above the optical coupler and performs beam shaping of the radiation before it is coupled into the waveguide or after it is coupled out of the waveguide. The chip is connected to the fiber holder such that the optical diffraction and refraction structure is located in the beam path between the coupler and the mirror surface. The at least one groove is formed in a substrate of the fiber holder, the substrate base material of which corresponds to the substrate base material of the chip.

A significant advantage of the structural element according to the invention can be considered to be the fact that optimum coupling conditions can be provided in a very simple manner by way of integrating waveguide, coupler and diffraction and refraction structure in the chip and, in addition, by way of the arrangement of the diffraction and refraction structure according to the invention in the beam path between the coupler and mirror surface.

A further advantage of the structural element according to the invention is that it is producible with great reproducibility because the components relevant for coupling, specifically the diffraction and refraction structure and also the grating coupler, can already be manufactured in connection with the chip-side production.

A further advantage of the structural element according to the invention can be considered to be the fact that it is possible, by way of the arrangement according to the invention of integrated optical waveguide, coupler, diffraction and refraction structure and mirror surface, to obtain a highly compact construction because 180° beam deflection can be advantageously provided. Provision may be made for example for the propagation direction of radiation that is to be coupled into the chip from a fiber that is held using the fiber holder and is thus aimed in the fiber in the direction of the mirror surface to be inverse with respect to the propagation direction that the radiation subsequently has in the waveguide that is integrated in the chip. In the case of a different beam propagation direction, it is possible for example for the integrated optical waveguide to extend below, and parallel to, the fiber to which it is optically coupled.

A further advantage of the structural element according to the invention is that the coefficients of thermal expansion of chip and fiber holder are the same, or at least substantially the same, because the substrate base materials correspond to one another.

The term "substrate base material" is here understood to be the actual base material, such as silicon, germanium, InP, GaAs etc., independently of any impurities or doping; the substrate of the chip and the substrate of the fiber holder can thus certainly differ in terms of type of doping (p-doping or n-doping) or in terms of the doping concentration.

Different doping of the substrates has no influence, or at least no relevant influence, on the coefficients of thermal expansion.

A groove end face of the groove or a layer applied on the groove end face preferably forms the mirror surface that reflects radiation of the fiber in the direction of the chip and/or reflects radiation of the chip in the direction of the fiber.

The optical diffraction and refraction structure is preferably situated in the beam path between the coupler and the groove end face.

The integrated optical waveguide and the fiber are preferably arranged one above the other, at least in the region of the coupler, and are oriented there to be parallel to one another.

The mirror surface reflects radiation coming from the fiber preferably in the direction of the chip with two directional components, one of which is perpendicular to the propagation direction of the radiation in the fiber and the other of which is opposite to the propagation direction of the radiation in the fiber, and the radiation that is coupled into the optical waveguide by way of the coupler propagates opposite to the propagation direction of the radiation in the fiber.

The diffraction and refraction structure is preferably situated in a plane parallel with respect to the waveguiding material layer or the waveguiding material layers.

The diffraction and refraction structure is preferably two-dimensionally locationally dependent, specifically in a dimension depending on the location along the longitudinal direction of the waveguide and in a dimension perpendicular with respect thereto depending on the location perpendicular to the longitudinal direction of the waveguide.

What is considered advantageous is if the optical diffraction and refraction structure has elevated rings which are formed each in one or more material layers of the chip situated above the optical grating coupler. The rings preferably have different sizes, with each ring enclosing in each case all smaller rings inside it.

The rings are preferably arranged in each case elliptically rather than concentrically with respect to one another.

The ellipse centers of the elliptic rings are preferably situated on a section that is situated—viewed in plan view—above the integrated optical waveguide and extends parallel to the longitudinal axis thereof and whose one section end is formed by the ellipse center of the smallest ring and whose other section end is formed by the ellipse center of the largest ring.

The groove preferably has a laterally expanding and vertically deepening portion, referred to as taper portion below.

The taper portion in a preferred embodiment variant extends up to the groove end face and becomes wider and deeper in the direction away from the groove end face. Due to the deepening of the groove, the longitudinal direction of the fiber and the plane of the upper groove opening surface preferably enclose an angle of between 0.1° and 40°, or are preferably at least not parallel with respect to one another.

The opening angle of the taper portion preferably ranges between 0.1° and 11°.

Due to the deepening of the groove, the plane of the mirror surface particularly preferably is at an angle of between 39.4° and 54.6° with respect to the longitudinal axis of the fiber; in this way, the mirror surface reflects radiation coming from the fiber in the direction of the chip with a directional component that is opposite to the propagation direction of the radiation in the fiber, and radiation that is coupled into the optical waveguide by way of the coupler propagates in a way opposite to the propagation direction of the radiation in the fiber.

The groove can have a holding portion which is arranged—as viewed from the groove end face—behind the taper portion and the groove width and the groove depth of which are constant.

The taper portion can form—as viewed in the longitudinal direction of the fiber—an abutment for the fiber at a distance from the groove end face.

In another advantageous embodiment, the groove has a holding portion which is arranged upstream of the groove end face and has a constant groove width and groove depth. The taper portion connects the holding portion to a groove end opening that is arranged at the end of the groove that is remote from the groove end face and through which the fiber is guided out of the groove to the outside. The taper portion makes insertion of the fiber into the groove easier, in particular when it is pushed in in the fiber longitudinal direction.

In yet another advantageous embodiment, a taper portion extends up to the groove end face and becomes narrower and flatter in the direction away from the groove end face. Due to the flattening of the groove, the longitudinal direction of the fiber and the plane of the upper groove opening surface preferably enclose an angle of between 0.1° and 10.5°, or are preferably at least not parallel with respect to one another.

The substrate of the fiber holder is preferably a silicon substrate. The groove is preferably a groove that is etched into the silicon substrate and V-shaped in cross section.

The groove walls of the groove and/or the groove end face are preferably formed by a (111) crystal plane or a crystal plane that is equivalent thereto or should be regarded as corresponding for symmetry reasons, in particular the (1-1-1) crystal plane of the silicon substrate.

The surface of the silicon substrate of the fiber holder is preferably formed by a (100) crystal plane. The plane of the upper groove opening surface is preferably parallel with respect to the (100) crystal plane of the silicon substrate.

Alternatively, the substrate of the fiber holder can be what is known as an off-axis substrate, in particular a silicon off-axis substrate.

The angle between the surface of the substrate of the fiber holder and the (100) crystal plane of the substrate is preferably between 0.1° and 9.5°. Due to an angular offset of this type, a taper (that is to say a widening and deepening or tapering and flattening) of the grooves can automatically be attained during etching of the grooves, wherein the flattening or deepening of the grooves causes an optimum angle between the fiber located in the groove and the mirror surface.

With respect to fiber fastening it is considered advantageous if the fiber is coated with a metallization layer and the metallization layer of the fiber is soldered to groove walls of the groove. The higher process temperatures during soldering of the fibers as compared to an adhesive connection offer greater flexibility with respect to subsequent process steps, for example during soldering of the substrate onto the chip.

It is also advantageous if the substrate of the fiber holder is coated with a spacer layer, in particular a silicon dioxide layer. The fiber that has been placed into the groove is preferably flush in terms of height with the spacer layer, or the spacer layer projects beyond it. The spacer layer can advantageously also form—as viewed in the longitudinal direction of the fiber—an abutment for the fiber.

With a view to a simple assembly, it is moreover considered to be advantageous if the substrate of the fiber holder has at least one concave fastening recess in which an associated convex fastening portion of the chip engages. Alternatively, an inverse configuration is conceivable and advantageous, that is to say one in which the substrate of the fiber holder has at least one convex fastening portion which engages in an associated concave fastening recess in the chip.

With particular preference, the chip is based on SOI (silicon on insulator) material. In the case of such a material system, it is considered to be advantageous if the integrated optical waveguide is a rib waveguide having a rib which is formed in a waveguiding silicon cover layer, situated on a silicon dioxide layer, of the SOI material and has a longitudinal direction that extends along the propagation direction of the radiation that is guided in the SOI rib waveguide. The optical diffraction and refraction structure in this case is integrated in one or more layers of the chip that are situated above the silicon cover layer. The substrate of the fiber holder in this embodiment is preferably a silicon substrate.

The grating coupler may be a one-dimensional or two-dimensional grating coupler which is preferably likewise formed in the waveguiding silicon cover layer.

For example, the grating coupler can be a diffractive element which couples radiation into one or more waveguides and is preferably likewise formed in the waveguiding silicon cover layer.

The grating coupler is preferably a Bragg grating or preferably at least also comprises a Bragg grating.

Moreover, the invention relates to a method for producing a photonic structural element, wherein in the method a photonically integrated chip is mechanically connected to a fiber holder and an optical fiber is placed into at least one groove in the fiber holder, before, during or after the connection of chip and fiber holder.

With respect to such a method, provision is made in accordance with the invention for a chip to be connected to the fiber holder, said chip having a substrate, the substrate base material of which corresponds to the substrate base material of the substrate of the fiber holder, an integrated optical waveguide that is integrated in one or more waveguiding material layers of the chip which are situated on the substrate, a coupler, in particular a grating coupler, that is formed in the optical waveguide or connected to the optical waveguide, and an optical diffraction and refraction structure that is integrated in one or more material layers of the chip which are situated—as viewed from the substrate—above the optical coupler and performs beam shaping of the radiation before it is coupled into the waveguide or after it is coupled out of the waveguide. The chip is connected to the fiber holder such that the optical diffraction and refraction structure is located in the beam path between the coupler and a mirror surface of the fiber holder.

With respect to the advantages of the method according to the invention, reference is made to the above statements relating to the advantages of the structural element according to the invention.

It is considered to be particularly advantageous if the chip has a photodiode which is monolithically integrated preferably in the substrate of the chip and is in connection with the integrated optical waveguide, radiation is radiated into the fiber at the fiber end of the fiber that is remote from the mirror surface of the fiber holder, and, during the placement of the fiber into the fiber holder and/or during the assembly of chip and fiber holder, the signal of the photodiode is evaluated and the adjustment of the fiber in the fiber holder and/or the adjustment between the chip and the fiber holder is performed in dependence on the signal of the photodiode or at least also in dependence on the signal of the photodiode.

BRIEF DESCRIPTION OF THE DRAWINGS

The invention will be explained in more detail below on the basis of exemplary embodiments; the figures are described briefly below.

FIG. 7 shows a plan view of a second exemplary embodiment for a fiber holder which can be used in the photonic structural element as per FIG. 1.

FIG. 8 shows the fiber holder as per FIG. 7 in cross section.

FIG. 9 shows a plan view of a third exemplary embodiment for a fiber holder which can be used in the photonic structural element as per FIG. 1.

FIG. 10 shows the fiber holder as per FIG. 9 in cross section.

DETAILED DESCRIPTION

For the sake of clarity, the same reference signs have always been used in the figures for identical or comparable components.

Figure 1:
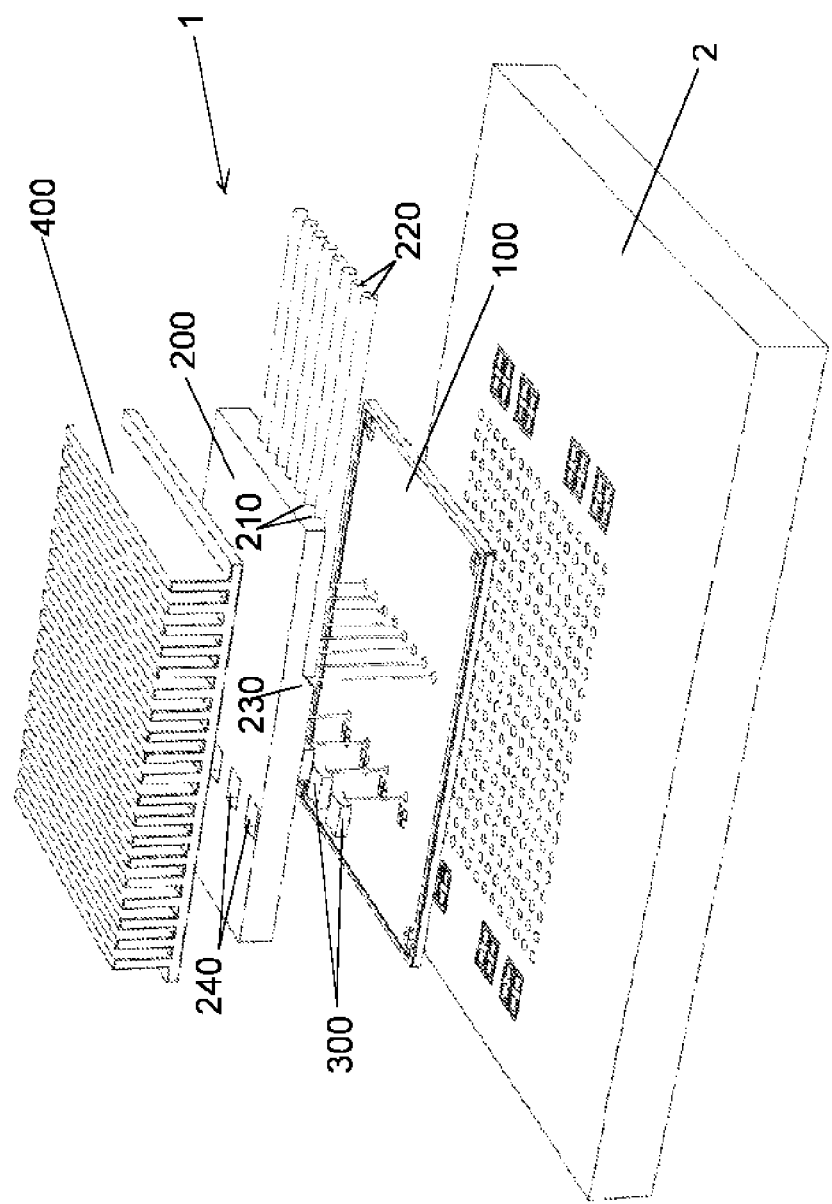
FIG. 1 shows a three-dimensional exploded representation of an exemplary embodiment for a photonic structural element according to the invention.

FIG. 1 shows a three-dimensional exploded representation of an exemplary embodiment for a photonic structural element 1. The structural element 1 comprises a photonically integrated chip 100, on which a fiber holder 200 is placed.

The fiber holder 200 has grooves 210, into which optical light guide fibers, in short fibers 220 below, are placed. For deflecting radiation that is to be coupled into or out of the fibers 220, mirror surfaces 230 are provided in the region of the groove end faces of the grooves 210.

Mounted on the photonically integrated chip 100 in the exemplary embodiment as per FIG. 1 are lasers 300, with a heat sink 400 being provided for cooling them. Passage holes 240 are provided in the fiber holder for thermal coupling between the lasers 300 and the heat sink 400.

The photonic structural element 1, consisting of the chip 100, the fiber holder 200, the lasers 300 and the heat sink 400, can be mounted for example on a printed circuit board 2.

Figure 2:
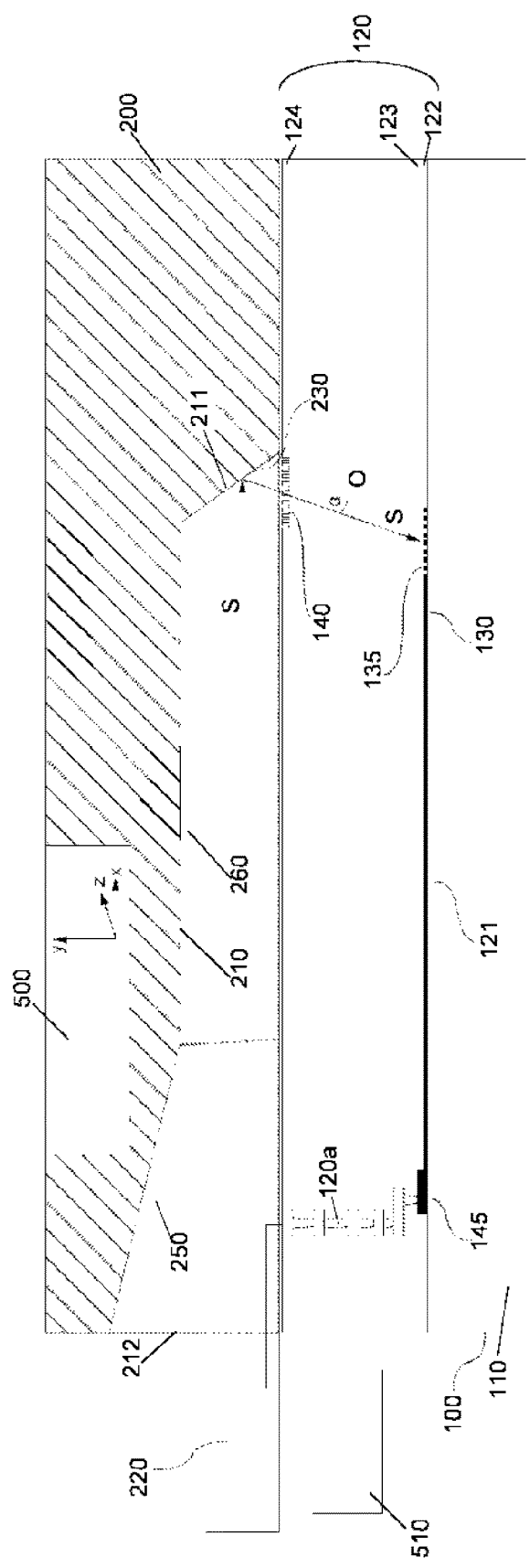
FIG. 2 shows the structural element as per FIG. 1 in cross section.

FIG. 2 shows the photonic structural element 1 as per FIG. 1 in cross section. It shows a fiber 220, which is placed in a groove 210 of the fiber holder 200. The mirror surface 230 is formed by the groove end face 211 of the groove 210 or by a reflective layer (e.g., gold layer) or layer package applied on the groove end face 211.

In the exemplary embodiment, the groove end face 211 of the groove 210 forms an abutment for the fiber 220; in other words, the fiber end of the fiber 220 directly abuts the groove end face 211.

The groove 210 comprises two portions, specifically a taper portion 250 and a holding portion 260. The taper portion 250 extends from a groove end opening 212, at which the fiber 220 leaves the fiber holder 200, up to the holding portion 260, which in turn extends from the taper portion 250 up to the groove end face 211. The taper portion 250 thus separates the groove end opening 212 from the holding portion 260.

The taper portion 250 becomes wider and deeper in the direction of the groove end opening 212, with the width and depth of the taper portion 250 reaching a maximum in the region of the groove end opening 212. Due to the widening and deepening of the taper portion 250, placement of the fiber 220 into the groove 210 from the outside is made easier.

In the region of the holding portion 260, the groove width and the groove depth of the groove 210 are constant, with the width and the depth of the groove 210 being selected such that the fiber 220 assumes a specified spatial orientation within the fiber holder 200.

The chip 100 is arranged below the fiber holder 200. The chip 100 comprises a substrate 110, which may be for example a silicon substrate.

Arranged on the substrate 110 is a layer package 120 having a multiplicity of material layers. Integrated in the layer package 120 in the exemplary embodiment as per FIG. 2 are an optical waveguide 130, a grating coupler 135, a diffraction and refraction structure in the form of a lens 140 and a photodetector 145.

The first, or lowermost, layer of the layer package 120 situated on the substrate 110 is a silicon oxide layer, placed on which is a silicon layer 122. Integrated in the silicon layer 122 are the optical waveguide 130 and the grating coupler 135. The optical waveguide 130 can be for example what is known as an SOI rib or strip waveguide, in which the optical radiation is guided in the silicon layer 122.

The photodetector 145 can be integrated in modified portions of the silicon layer 122 and/or in another layer 123 situated on the silicon layer 122, which other layer may be for example a germanium layer or silicon germanium layer.

Integrated in the uppermost material layer 124, or at least in one of the upper material layers of the layer package 120, is the lens 140. That means that the lens 140 is situated—as viewed from the substrate 110—above the waveguiding layer 122 of the layer package 120, or above the layer in which the grating coupler 135 and the optical waveguide 130 are integrated.

Contact with the photodetector 145 can be made, for example, via passage holes 120a, which extend upwardly through the layer package 120.

FIG. 2 moreover shows an orientation unit 500, with which the fiber holder 200 can be moved relative to the chip 100, which is situated therebelow, in the x-direction, y-direction and z-direction in order to establish an optimum adjustment position of the fiber holder 200 before the parts 100 and 200 are fixedly connected to one another. The orientation unit 500 is preferably actuated by a control unit 510, which is in contact with the photodetector 145 via the passage holes 120a and evaluates the photocurrent or detection signal thereof. The control unit 510 is thus able, using the orientation unit 500, to bring the fiber holder 200 into a position in which maximum coupling of radiation between the fiber 220 and the optical waveguide 130 situated therebelow is attained.

Moreover, FIG. 2 shows by way of example the beam trajectory of optical radiation S, which is coupled into the chip 100 by the fiber 220. The radiation S is reflected at the mirror surface 230, or at the groove end face 211, and is incident on the lens 140 at an angle α with respect to the surface normal O on the top side of the layer package 120. The lens 140 forms an optical diffraction and refraction structure, which directs the radiation S in the direction of the grating coupler 135. The grating coupler 135 couples the radiation S into the optical waveguide 130, which guides the radiation to the photodetector 145. The propagation direction of the radiation S in the optical waveguide 130 is preferably opposite to the propagation direction in the fiber 220, which results in a compact construction.

Figure 3:
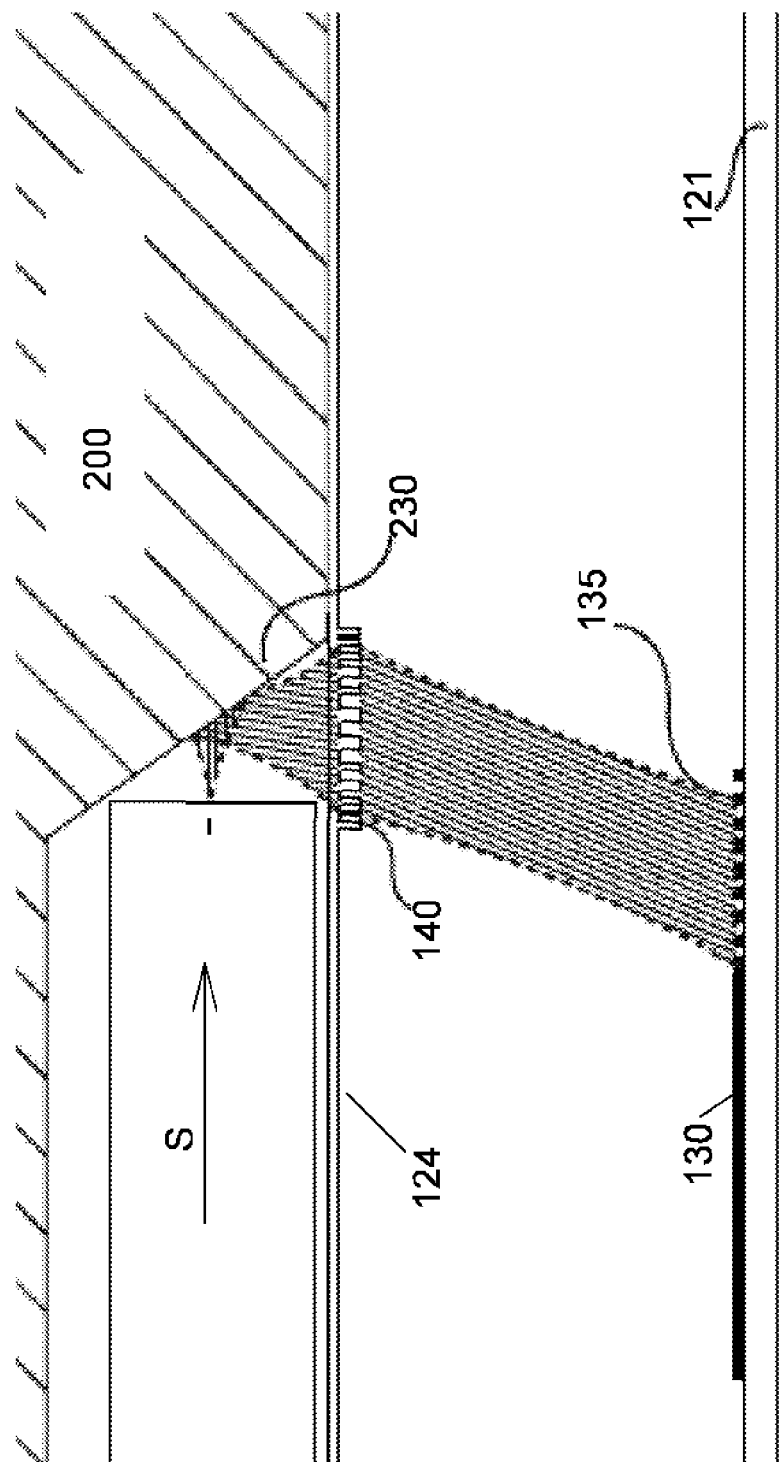
FIG. 3 shows the deflection of optical radiation in the structural element as per FIGS. 1 and 2 in more detail.

FIG. 3 shows the deflection of the radiation S by the mirror surface 230 and the lens 140 in more detail. Among other things, it shows that the lens 140 can be formed by steps in the material layer 124.

Figure 4:
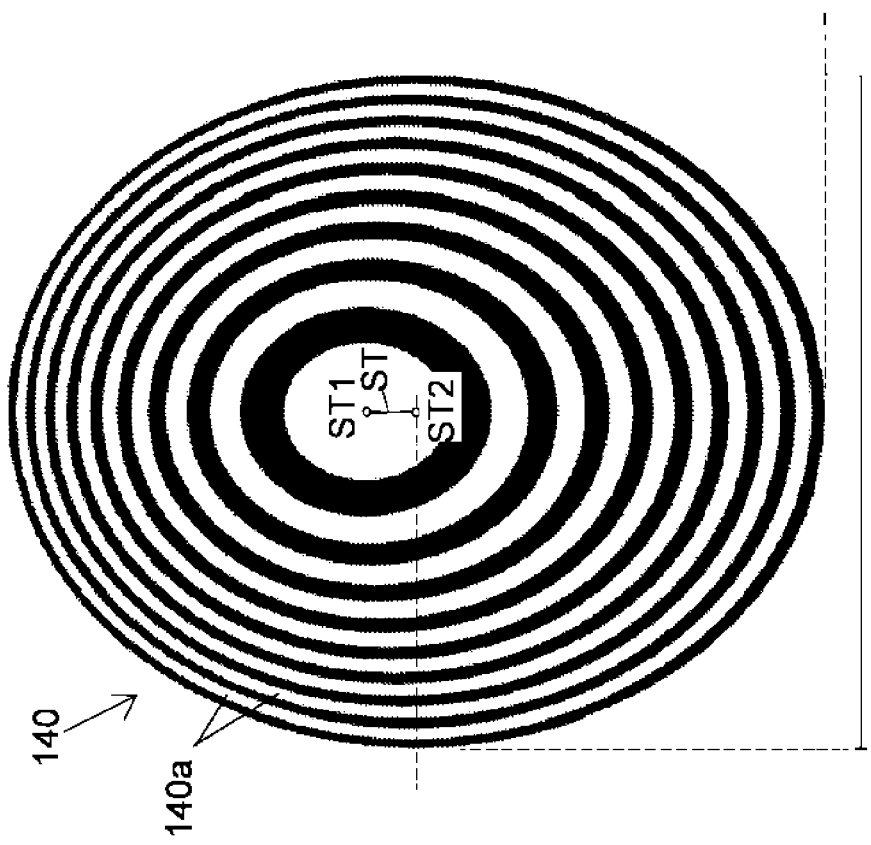
FIG. 4 shows an exemplary embodiment for a lens that can be used in the structural element as per FIGS. 1 to 3.

FIG. 4 shows in more detail an exemplary embodiment for the lens 140 in plan view. The lens 140 has elevated rings 140a, which are formed by steps in the material layer 124 (cf. FIGS. 2 and 3). The rings 140a have different sizes, with each ring enclosing in each case all smaller rings inside it. The lens 140 is therefore somewhat similar to a Fresnel lens.

In contrast to a classic Fresnel lens, the rings 140a are elliptical rather than circularly round, nor are they concentrically arranged with respect to one another. FIG. 4 shows, for example, that the ellipse centers of the elliptical rings 140a are located on a section ST which is—in the plan view as per FIG. 4—parallel with respect to the longitudinal axis of the waveguide 130 (cf. FIGS. 2 and 3). One section end ST1 of the section ST is formed by the ellipse center of the smallest ring of the lens 140; the other section end ST2 of the section ST is formed by the ellipse center of the largest ring.

Figure 5:
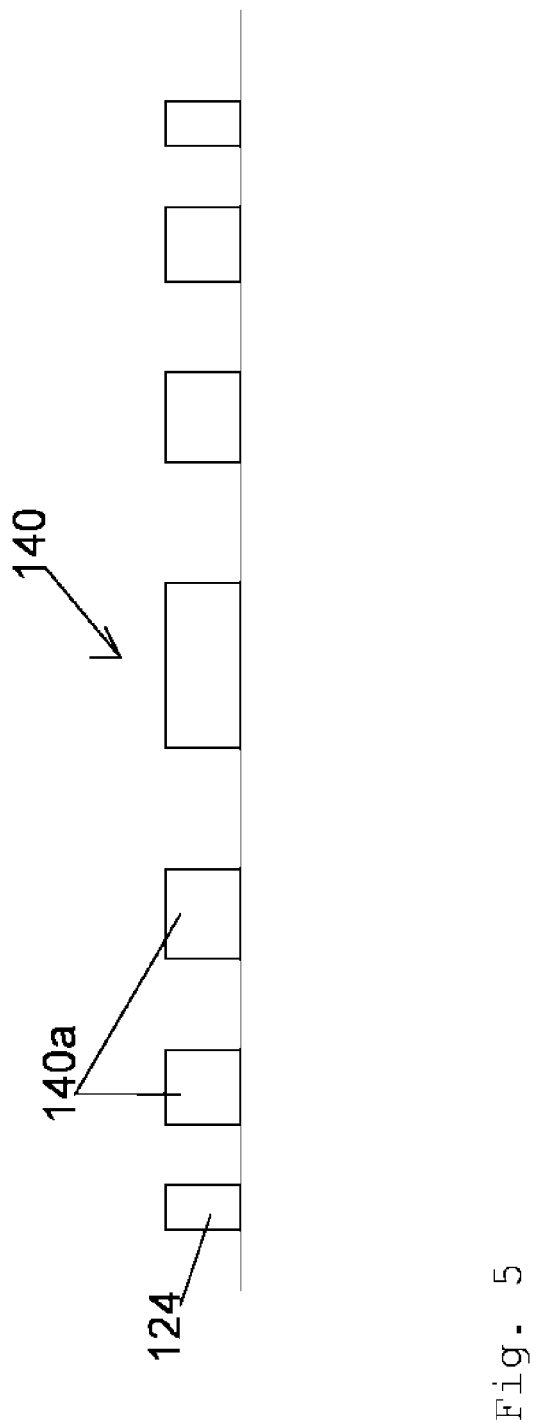
FIG. 5 shows the structure of the lens as per FIG. 4 in cross section.

FIG. 5 shows in more detail a cross section of the formation of the rings 140a by steps in the material layer 124.

Figure 6:
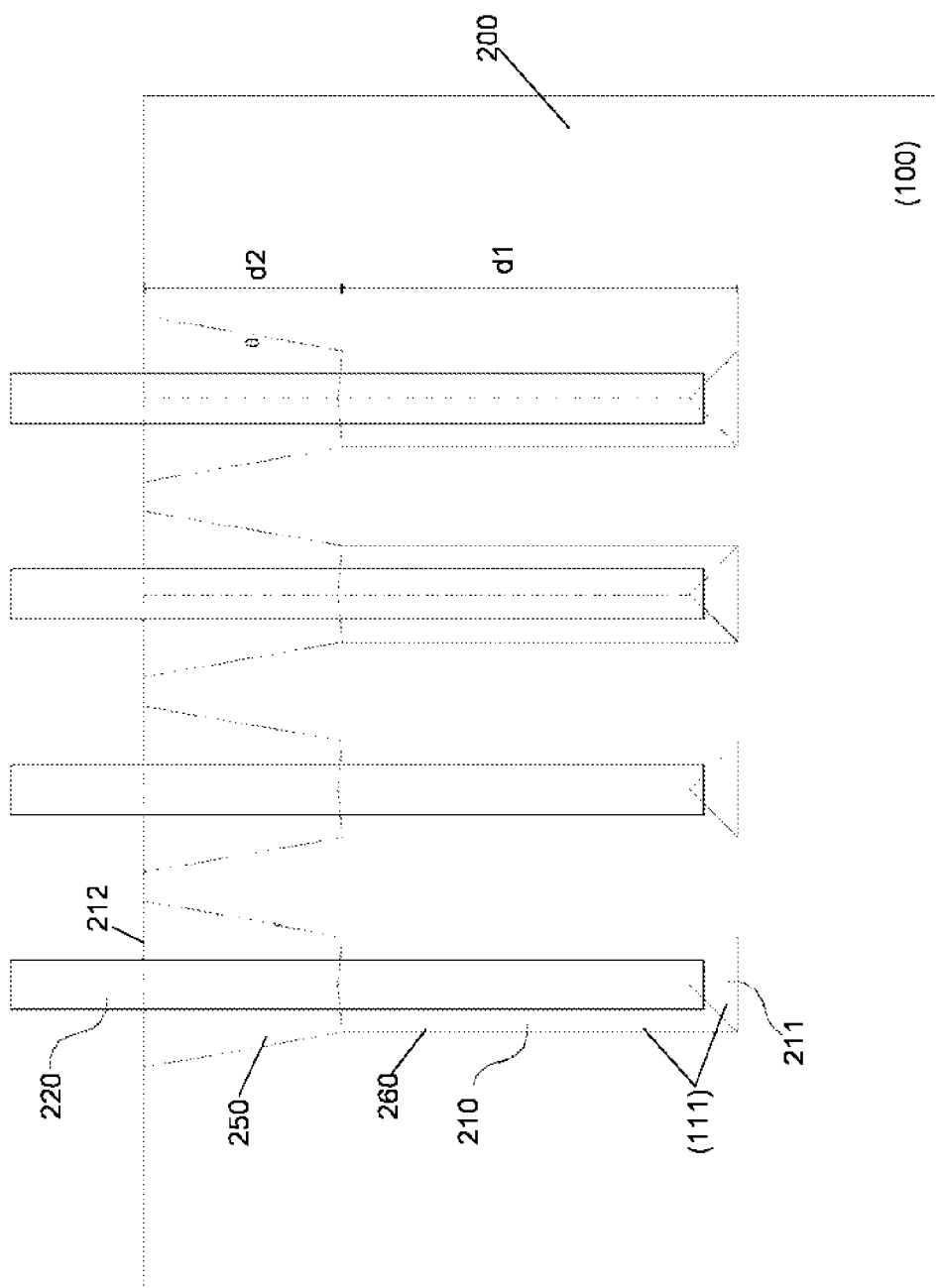
FIG. 6 shows a fiber holder of the photonic structural element as per FIGS. 1 to 3 in plan view.

FIG. 6 shows in more detail a plan view of the fiber holder 200 as per FIGS. 1 and 2. It shows the grooves 210, which in each case comprise a taper portion 250 and a holding portion 260. The arrangement of the taper portions 250 is selected such that they become deeper and wider toward the groove end opening 212 to make it easier to slide the fibers 220 into the respective groove 210. The length d2 of the taper portion 250 is preferably at least 0.5 millimeters; the opening angle θ is preferably between 1° and 45°.

The holding portion 260 forms the groove end face 211 of the groove 210 which the fiber 220 abuts. The length d1 of the holding portion 260 is preferably at least 1 millimeter.

It is considered advantageous if the fiber holder 200 has, or comprises, a substrate made of silicon. If the material is silicon having a (100) crystal orientation of the surface, V-shaped grooves or V grooves can be anisotropically etched for example using KOH. The groove walls and the groove end face 211 are in this case formed by (111) crystal planes of the silicon.

FIG. 7 shows a second exemplary embodiment for a fiber holder 200 which can be used in the structural element 1 as per FIG. 1. In contrast to the exemplary embodiment as per FIGS. 1, 2 and 6, the holding portion 260 in the exemplary embodiment as per FIG. 7 is connected to the groove end opening 212, and the taper portion 250 forms the groove end face 211, or the mirror surface 230.

The orientation of the taper portion 250 is selected such that the groove 210 becomes wider and deeper from the groove end surface 211 in the direction of the groove end opening 212, or in the direction of the holding portion 260, with the taper portion 250 adjoining the holding portion 260 at the interface therewith preferably without a step or discontinuity.

Due to the fact that the taper portion 250 tapers in the direction of the groove end face 211, the side walls of the taper portion 250 can form an abutment for the fiber 220, with the abutment having a distance from the groove end face 211. In other words, what can be achieved is that the fiber end of the fiber 220 does not about the groove end face 211, or the mirror surface 230, as is the case for example in the variant as per FIGS. 2 and 6.

FIG. 8 shows the fiber holder 200 as per FIG. 7 in cross section. It shows that the taper portion 250 not only becomes narrower but also flatter in the direction of the groove end face 211. The groove end face 211 of the groove 210 is preferably formed by a (111) crystal surface of the substrate.

FIG. 9 shows an exemplary embodiment for a fiber holder 200, in which the grooves 210 are exclusively tapered, or are formed only by a taper portion 250. The taper portions 250 become wider and deeper starting from the groove end face 211 of the grooves 210 in the direction of the groove end opening 212.

FIG. 10 shows the fiber holder 200 as per FIG. 9 in cross section. It shows that, owing to the widening in the direction of the groove end opening 212, the groove bottom 213 of the groove 210 is no longer parallel with respect to the plane E210 of the upper groove opening surface but encloses an angle β therewith. Since the fiber 220 is parallel with respect to the groove bottom 213, the longitudinal axis of the fiber 220 also has the angle β with respect to the plane E210. The angle β changes the angle between the longitudinal axis of the fiber 220 and the mirror surface 230, as a result of which the angle α between the propagation direction of the radiation S and the surface normal O is also changed.

In the exemplary embodiment as per FIGS. 9 and 10, a consequence of the deepening of the grooves is thus that the fibers are situated at an angle in the grooves; the angle β changes the angle α between the fiber 220 and the mirror surface 213 and consequently also the entrance angle of the radiation S in the chip located therebelow.

Figure 11:
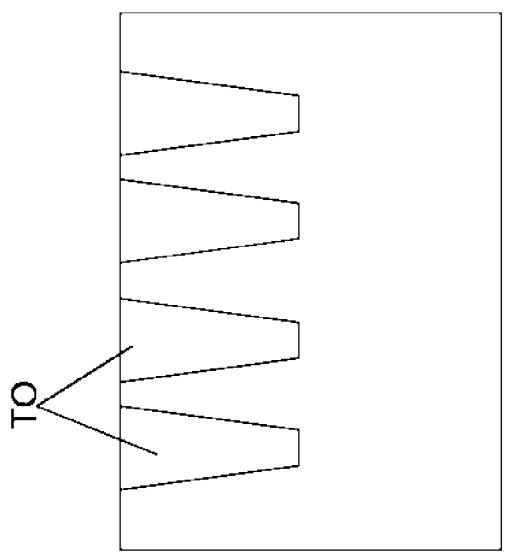
FIG. 11 shows an exemplary embodiment for an etching mask structure with which the grooves of the fiber holder for the embodiment variant as per FIGS. 9 and 10 can be produced.

The tapered grooves 210 shown in FIGS. 9 and 10 are obtained when using silicon wafers having a (100) crystal orientation by way of holes being etched into the crystal using a mask with trapezoidal mask opening holes TO. FIG. 11 shows an exemplary embodiment for a suitable mask structure.

Figure 12:
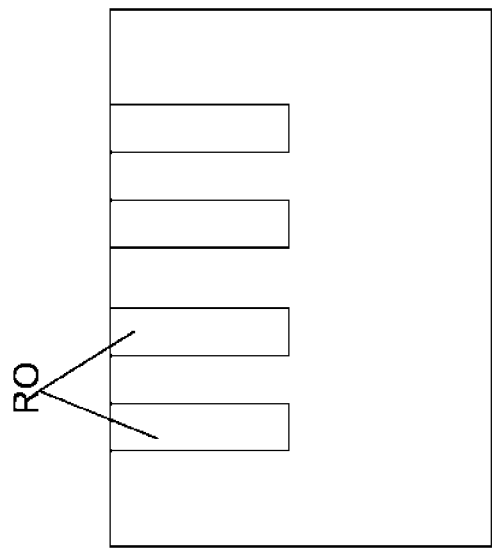
FIG. 12 shows an exemplary embodiment for an etching mask structure with which the fiber holder as per FIGS. 9 and 10 can be produced when an off-axis substrate material is used.

Alternatively (or additionally), it is possible for an off-axis wafer material to be used for the substrate of the fiber holder 200, that is to say a wafer material in which the surface of the silicon substrate has an angular offset of preferably between 0.1° and 9.5° with respect to the (100) crystal plane. In such a case, tapered grooves can also be produced using an etching mask that has rectangular mask opening holes RO, as is shown by way of example in FIG. 12. The taper, or the lateral and vertical widening, of the grooves 210 in this case is the result of the angular offset of the crystal orientation if the grooves are etched using an anisotropic, that is to say a crystal-direction-dependent, etching agent.

Figure 13:
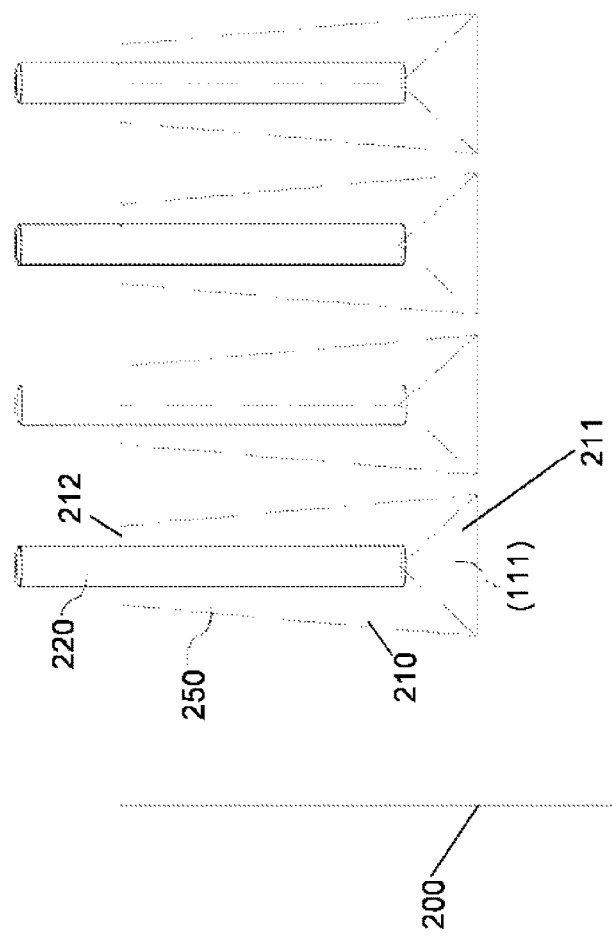
FIG. 13 shows a plan view of a fourth exemplary embodiment for a fiber holder which can be used in the photonic structural element as per FIG. 1.
Figure 14:
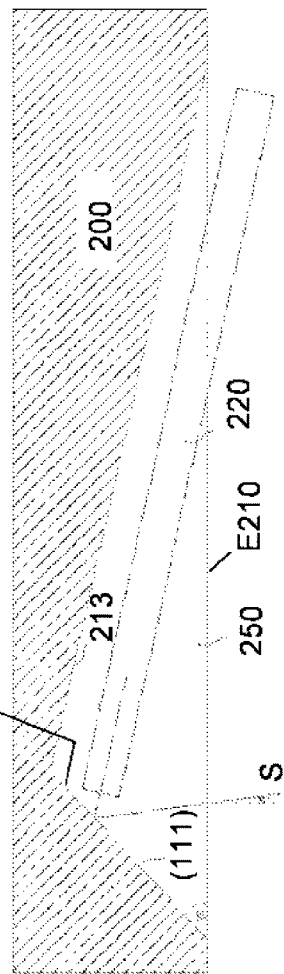
FIG. 14 shows the fiber holder as per FIG. 13 in cross section.

FIG. 13 shows an exemplary embodiment for a fiber holder 200, in which the grooves 210 are in each case tapered throughout, or are formed only by a taper portion 250. The orientation of the taper portion 250 in the exemplary embodiment as per FIG. 13 is inverse with respect to the orientation in the exemplary embodiment as per FIG. 9. For example, it can be seen that the grooves 210 become wider and deeper starting from the groove end opening 212 in the direction of the groove end face 211, as a result of which a tilting of the fibers 220 within the grooves 210 occurs, as was already explained in connection with FIGS. 9 and 10. However, due to the inverse orientation of the taper, the fiber end of the fiber 220 that faces the mirror surface 230 (cf. FIG. 14) is deeper than in the region of the groove end opening 212, as a result of which the angle between the longitudinal axis of the fiber 220 and the mirror plane of the mirror surface 230 becomes greater rather than—as is the case in the exemplary embodiment as per FIGS. 9 and 10—smaller. In other words, it is thus possible to set in a targeted fashion the angle of incidence of the radiation on the mirror surface 230 by way of the taper, wherein an increase or decrease of the angle of incidence is optionally possible.

Figure 15:
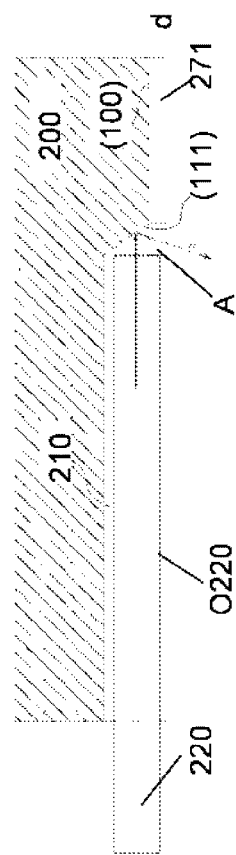
FIG. 15 shows a cross section of a fifth exemplary embodiment for a fiber holder which can be used in the photonic structural element as per FIG. 1.

FIG. 15 shows an exemplary embodiment for a fiber holder 200 comprising a substrate 270 and a spacer layer 271 located on the substrate 270. The thickness d of the spacer layer 271 can be for example between 2 and 25 μm, the thickness being preferably selected such that the spacer layer 271 projects beyond the fibers 220. That means that the upper edge O220 of the fibers 220 is preferably located—in plan view of the spacer layer 271—below the top side of the spacer layer 271.

The spacer layer 271 preferably also projects beyond a portion of the groove 210, in particular the region of the groove end face 211 of the groove 210 or a portion upstream of the groove end face 211, forming an abutment A for the fiber 220. The abutment A, or the spacer layer 271, thus makes possible defined positioning of the end face of the fiber 220 at a specified distance from the groove end face 211.

Figure 16:
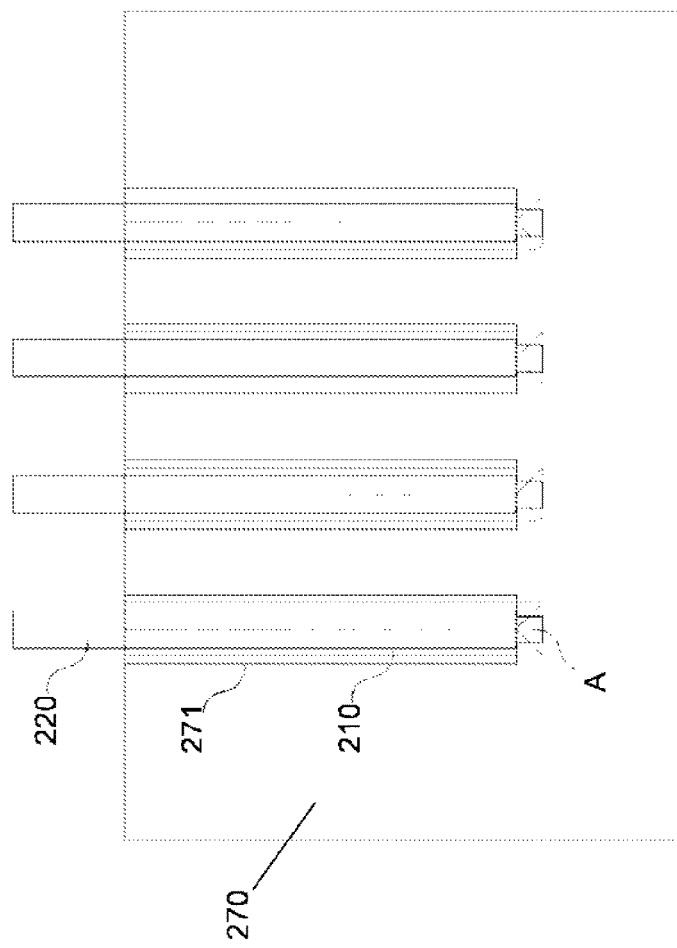
FIG. 16 shows the fiber holder as per FIG. 15 in plan view.

FIG. 16 shows the fiber holder 200 as per FIG. 15 again in plan view. It shows that an abutment A for the end face of the fiber 220 is provided by the spacer layer 271.

Figure 17:
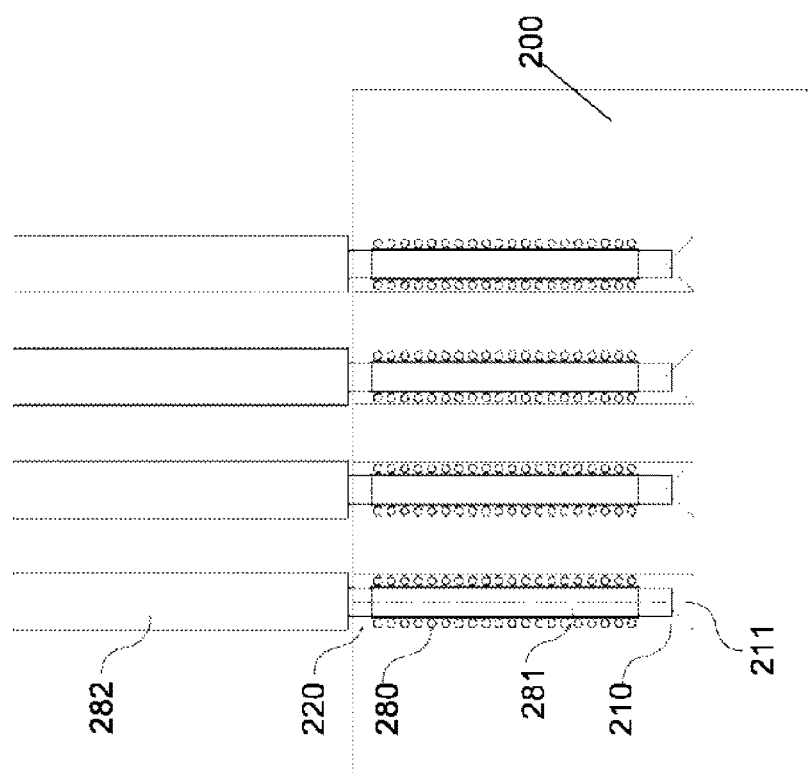
FIG. 17 shows a plan view of an exemplary embodiment for a fiber holder with fibers which have been soldered into place.

FIG. 17 shows an exemplary embodiment for a fiber holder 200 in which the fibers 220 have been soldered into place in the grooves 210. Using a solder connection advantageously makes it possible to attain greater flexibility with respect to subsequent process steps, for example when soldering the substrate onto the chip, than when using adhesive bonds.

The solder for the solder connection between the fiber 220 and the groove 210 can be applied for example in the form of solder balls 280 or by galvanic deposition, be it on the groove walls of the grooves 210 and/or on the surface of the fibers 220.

To achieve a good solder connection, it is advantageous if the fibers 220 are provided with a metal layer 281 before soldering.

An external fiber coating of the fiber 210 in the region outside the fiber holder 200 is designated in FIG. 17 with the reference sign 282.

Figure 18:
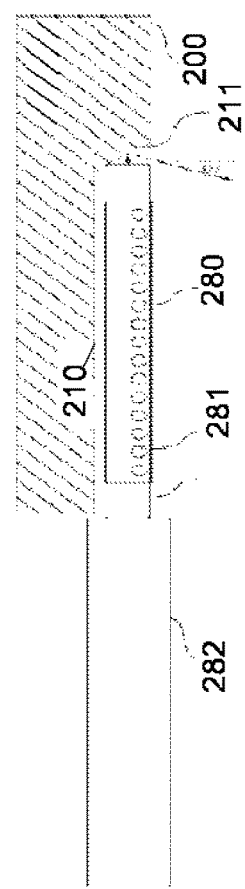
FIG. 18 the fiber holder as per FIG. 17 in cross section.

FIG. 18 shows the fiber holder 200 as per FIG. 17 in cross section. It shows a fiber 220 in the groove 210 associated therewith before soldering.

Figure 19:
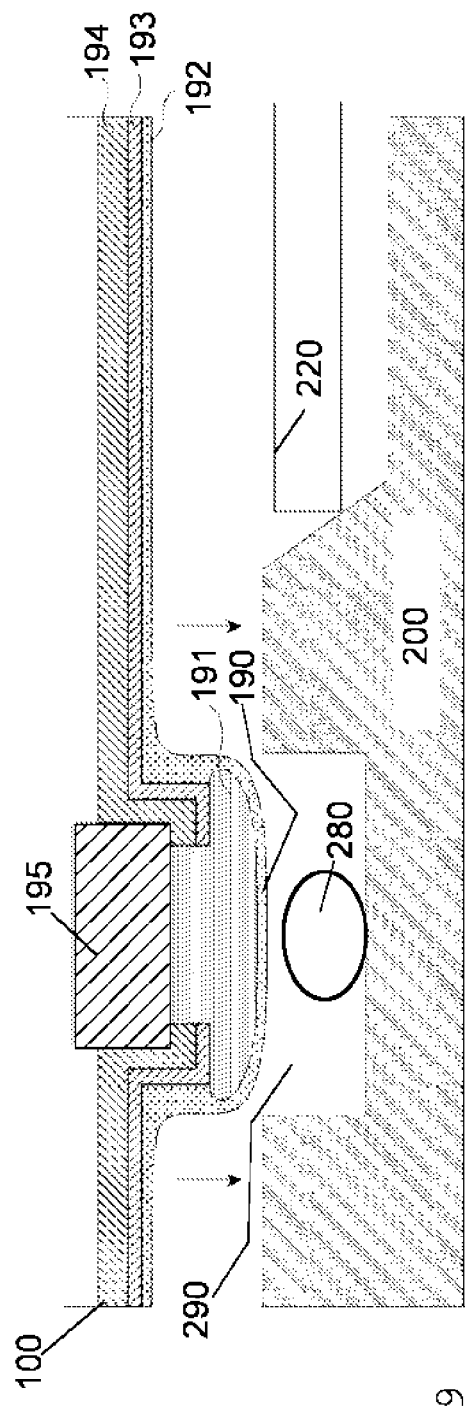
FIG. 19 shows an exemplary embodiment for a fiber holder in which concave fastening recesses for receiving associated convex fastening portions of the chip are provided, with FIG. 19 showing the fiber holder and the chip before assembly.

FIG. 19 shows an exemplary embodiment for a fiber holder 200, which is provided with a concave fastening recess 290. As part of the assembly of fiber holder 200 and chip 100, a convex fastening portion 190 of the chip 100 is placed into the fastening recess 290. The convex fastening portion 190 of the chip 100 can be soldered into place for example in the concave fastening recess 290, as is indicated by a solder ball 280 in FIG. 19.

The convex fastening portion 190 of the chip 100 can have a metal core 191, in particular a nickel core, that is coated with a gold layer 192. The metal core 191 can extend through an opening in a nitride layer 193 that is located thereabove and/or a silicon oxide layer 194 to a contact point 195 of the chip 100. The metal core 191 can thus for example form a constituent part of an electrical contact.

Figure 20:
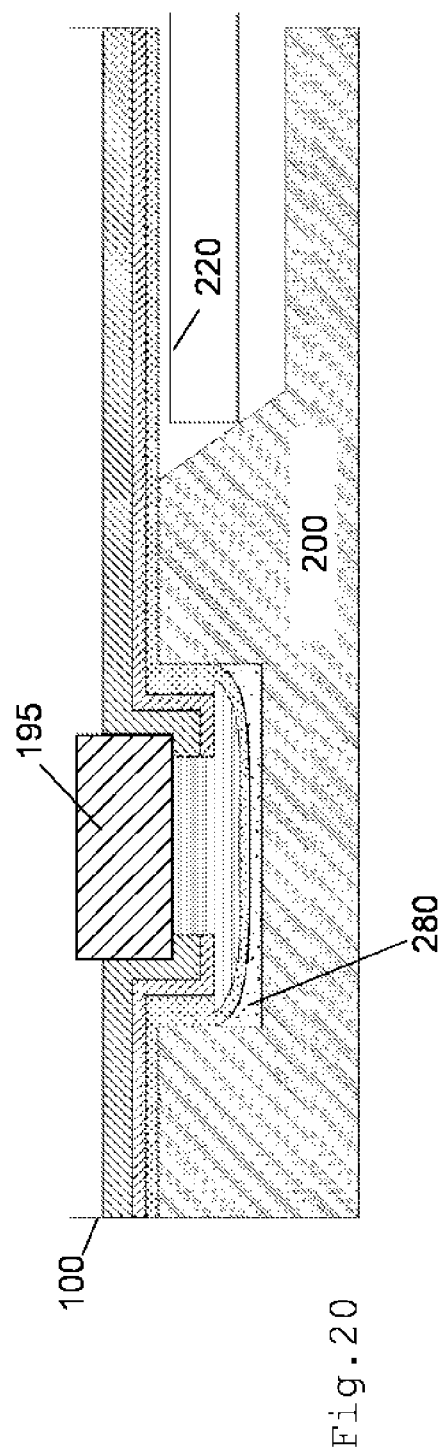
FIG. 20 shows the fiber holder and the chip as per FIG. 19 after assembly, or once the two parts have been slid inside one another.

Due to the engagement of fiber holder 200 and chip 100, the surfaces of the two parts can advantageously lie directly one on the other over the whole area after assembly, as can be seen in FIG. 20. The fibers 220 in this embodiment are preferably completely recessed in the fiber holder 200 or are preferably entirely accommodated therein.

The solder material of the solder ball 280 is uniformly distributed due to the placement of the convex fastening portion 190 inside the concave fastening recess 290, automatically, or without taking further measures, producing a highly stable connection.

Although the invention has been illustrated and described in more detail by way of preferred exemplary embodiments, the invention is not limited by the disclosed examples, and other variations can be derived herefrom by a person skilled in the art without departing from the scope of protection of the invention.

LIST OF REFERENCE SYMBOLS 1 structural element
2 printed circuit board
100 chip
110 substrate
120 layer package
120a passage hole
122 silicon layer
123 layer
124 uppermost material layer
130 optical waveguide
135 grating coupler
140 lens
140a ring
145 photodetector
190 convex fastening portion
191 metal core
192 gold layer
193 nitride layer
194 silicon oxide layer
195 contact point
200 fiber holder
210 groove
211 groove end face
212 groove end opening
213 groove bottom
220 fiber
230 mirror surface
240 passage hole
250 taper portion
260 holding portion
270 substrate
271 spacer layer
280 solder ball
281 metal layer
282 external fiber coating
290 concave fastening recess
300 laser
400 heat sink
500 orientation unit
510 control unit
A abutment
d thickness
d1 length of holding portion
d2 length of taper portion
E210 plane
O surface normal
O220 upper edge
RO rectangular mask opening hole
S radiation
ST section
ST1 section end
ST2 section end
TO trapezoidal mask opening hole
α angle
β angle
θ opening angle

The invention claimed is:

1. A photonic structural element (1) having a photonically integrated chip (100) and a fiber holder (200) which is mechanically connected to the chip (100), wherein the fiber holder (200) has:

at least one groove (210) into which an optical fiber (220) is placed, and
at least one mirror surface (230), which reflects radiation (S) of the fiber (220) in the direction of the chip (100) and/or reflects radiation (S) of the chip (100) in the direction of the fiber (220), characterized in that
the chip (100) has:
a substrate (110), the substrate base material of which is a semiconductor material,
an integrated optical waveguide (130), which is integrated in one or more waveguiding material layers (122) of the chip (100) which are located on the substrate (110),
a coupler, in particular a grating coupler (135), that is formed in the optical waveguide (130) or connected to the optical waveguide (130), and
an optical diffraction and refraction structure that is integrated in one or more material layers (124) of the chip (100) which are situated—as viewed from the substrate (110)—above the optical coupler and performs beam shaping of the radiation (S) before it is coupled into the waveguide (130) or after it is coupled out of the waveguide (130),
the chip (100) is connected to the fiber holder (200) such that the optical diffraction and refraction structure is located in the beam path between the coupler and the mirror surface (230), and
the at least one groove (210) is formed in a substrate (270) of the fiber holder (200), the substrate base material of which corresponds to the substrate base material of the chip (100).

2. The structural element (1) as claimed in claim 1, characterized in that
a groove end face (211) of the groove (210) or a layer applied on the groove end face (211) forms the mirror surface (230) that reflects radiation (S) of the fiber (220) in the direction of the chip (100) and/or reflects radiation (S) of the chip (100) in the direction of the fiber (220), and
the optical diffraction and refraction structure is situated in the beam path between the coupler and the groove end face (211).

3. The structural element (1) as claimed in claim 1, characterized in that
the integrated optical waveguide (130) and the fiber (220) are arranged one above the other, at least in the region of the coupler, and are oriented there to be parallel to one another,
the mirror surface (230) reflects radiation (S) coming from the fiber (220) in the direction of the chip (100) with two directional components, one of which is perpendicular to the propagation direction of the radiation (S) in the fiber (220) and the other of which is opposite to the propagation direction of the radiation (S) in the fiber (220), and
the radiation (S) that is coupled into the optical waveguide (130) by way of the coupler propagates opposite to the propagation direction of the radiation (S) in the fiber (220).

4. The structural element (1) as claimed in claim 1, characterized in that
the diffraction and refraction structure is situated in a plane parallel with respect to the waveguiding material layer or the waveguiding material layers, and
the diffraction and refraction structure is two-dimensionally locationally dependent, specifically in a dimension depending on the location along the longitudinal direction of the waveguide (130) and in a dimension perpendicular with respect thereto depending on the location perpendicular to the longitudinal direction of the waveguide (130).

5. The structural element (1) as claimed in claim 1, characterized in that
the optical diffraction and refraction structure has elevated rings (140a) which are formed each in one or more material layers (124) of the chip (100) which are situated above the optical grating coupler (135),
    wherein the rings (140a) have different sizes, with each ring (140a) enclosing in each case all smaller rings (140a) inside it,
        wherein the rings (140a) are each elliptical and are arranged non-concentrically with respect to one another, and
        wherein the ellipse centers of the elliptic rings (140a) are situated on a section (ST) that is situated—viewed in plan view—above the integrated optical waveguide (130) and extends parallel to the longitudinal axis thereof and whose one section end (ST1) is formed by the ellipse center of the smallest ring and whose other section end (ST2) is formed by the ellipse center of the largest ring.

6. The structural element (1) as claimed in claim 1, characterized in that
the groove (210) has a laterally expanding and vertically deepening portion, referred to as taper portion (250) below.

7. The structural element (1) as claimed in claim 6, characterized in that
    the taper portion (250) extends up to the groove end face (211) and becomes wider and deeper in the direction away from the groove end face (211), and
    due to the deepening of the groove (210), the longitudinal direction of the fiber (220) and the plane of the upper groove opening surface (250) enclose an angle of between 0.1° and 40°, or are at least not parallel with respect to one another.

8. The structural element (1) as claimed in claim 7, characterized in that
    the opening angle of the taper portion (250) preferably ranges between 0.1° and 11°, and/or
    due to the deepening of the groove (210), the plane of the mirror surface (230) is at an angle of between 39.4° and 54.6° with respect to the longitudinal axis of the fiber (220), and, in this way, the mirror surface (230) reflects radiation (S) coming from the fiber (220) in the direction of the chip (100) with a directional component that is opposite to the propagation direction of the radiation (S) in the fiber (220), and radiation (S) that is coupled into the optical waveguide (130) by way of the coupler propagates in a way opposite to the propagation direction of the radiation (S) in the fiber (220).

9. The structural element (1) as claimed in claim 7, characterized in that
    the groove (210) has a holding portion (260) which is arranged—as viewed from the groove end face (211)—behind the taper portion (250) and the groove width and the groove depth of which are constant, and
    the fiber (220) is situated in the holding portion (260), and the taper portion (250) forms—viewed in the longitudinal direction of the fiber (220)—an abutment (A) for the fiber (220) at a distance from the groove end face (211).

10. The structural element (1) as claimed in claim 6, characterized in that
    the groove (210) has a holding portion (260) which is arranged upstream of the groove end face (211), the groove width and the groove depth of which are constant, and
    the taper portion (250) connects the holding portion (260) to a groove end opening that is arranged at the end of the groove (210) that is remote from the groove end face (211) and through which the fiber (220) is guided out of the groove (210) to the outside.

11. The structural element (1) as claimed in claim 6, characterized in that
    the taper portion (250) extends up to the groove end face (211) and becomes narrower and flatter in the direction away from the groove end face (211), and
    due to the flattening of the groove (210), the longitudinal direction of the fiber (220) and the plane of the upper groove opening surface (250) enclose an angle of between 0.1° and 10.5°, or are at least not parallel with respect to one another.

12. The structural element (1) as claimed in claim 1, characterized in that
    the fiber holder (200) comprises, as the above-mentioned substrate (110), a silicon substrate, and the groove (210) is a groove (210) that is etched into the silicon substrate and V-shaped in cross section, and
    the groove walls of the groove (210) and/or the groove end face (211) are formed by a (111) crystal plane or a crystal plane that is equivalent thereto or should be regarded as corresponding for symmetry reasons, in particular the (1-1-1) crystal plane of the silicon substrate.

13. The structural element (1) as claimed in claim 1, characterized in that
    the surface of the substrate of the fiber holder (200) is formed by a (100) crystal plane, and
    the plane of the upper groove opening surface (E210) is parallel with respect to the (100) crystal plane of the substrate.

14. The structural element (1) as claimed in claim 1, characterized in that
the angle between the surface of the substrate of the fiber holder (200) and the (100) crystal plane of the substrate of the fiber holder (200) is between 0.1° and 9.5°.

15. The structural element (1) as claimed in claim 1, characterized in that
    the fiber (220) is coated with a metallization layer (281), and
    the metallization layer (281) of the fiber (220) is soldered to groove walls of the groove (210).

16. The structural element (1) as claimed in claim 1, characterized in that
    the substrate of the fiber holder (200) is coated with a spacer layer (271), in particular a silicon dioxide layer,
    wherein the fiber (220) that has been placed into the groove (210) is flush in terms of height with the spacer layer (271), or the spacer layer (271) projects beyond it, and/or the spacer layer (271) forms—as viewed in the longitudinal direction of the fiber (220)—an abutment (A) for the fiber (220).

17. The structural element (1) as claimed in claim 1, characterized in that
the substrate (110), in particular silicon substrate, of the fiber holder (200) has at least one concave fastening recess (290) in which an associated convex fastening portion (190) of the chip (100) engages.

18. A method for producing a photonic structural element (1), wherein in the method a photonically integrated chip (100) is mechanically connected to a fiber holder (200) and an optical fiber (220) is placed into at least one groove (210) in the fiber holder (200), before, during or after the connection of chip (100) and fiber holder (200), characterized in that connected to the fiber holder (200) is a chip (100) which has
- a substrate (110), the substrate base material of which corresponds to the substrate base material of the substrate (110) of the fiber holder (200),
- an integrated optical waveguide (130), which is integrated in one or more waveguiding material layers of the chip (100) which are located on the substrate (110),
- a coupler, in particular a grating coupler (135), that is formed in the optical waveguide (130) or connected thereto, and
- an optical diffraction and refraction structure that is integrated in one or more material layers of the chip (100) which are situated—as viewed from the substrate (110)—above the optical coupler and performs beam shaping of the radiation (S) before it is coupled into the waveguide (130) or after it is coupled out of the waveguide (130), and the chip (100) is connected to the fiber holder (200) such that the optical diffraction and refraction structure is located in the beam path between the coupler and a mirror surface (230) of the fiber holder (200).

19. The method as claimed in claim 18, characterized in that
- the chip (100) has a photodiode which is monolithically integrated preferably in the substrate (110) of the chip (100) and is in connection with the integrated optical waveguide (130),
- radiation (S) is radiated into the fiber (220) at a fiber end of the fiber (220) that is remote from the mirror surface (230) of the fiber holder (200), and,
- during the placement of the fiber (220) into the fiber holder (200) and/or during the assembly of chip (100) and fiber holder (200), the signal of the photodiode is evaluated and the adjustment of the fiber (220) in the fiber holder (200) and/or the adjustment between the chip (100) and the fiber holder (200) is performed in dependence on the signal of the photodiode or at least also in dependence on the signal of the photodiode.

* * * * *